United States Patent [19]
Allen

[11] Patent Number: 5,752,730
[45] Date of Patent: May 19, 1998

[54] HOIST TRANSPORT TOOL

[75] Inventor: Charles R. Allen, Dickinson, Tex.

[73] Assignee: Houston Industries Incorporated, Houston, Tex.

[21] Appl. No.: 747,771

[22] Filed: Nov. 13, 1996

[51] Int. Cl.$^6$ ................................................ B65G 7/12
[52] U.S. Cl. ...................................... 294/15; 294/145
[58] Field of Search .......................... 294/1.1, 15, 16, 294/26, 137, 145

[56] References Cited

U.S. PATENT DOCUMENTS

| | | | |
|---|---|---|---|
| 1,635,259 | 7/1927 | Critchley | 294/15 |
| 1,675,812 | 7/1928 | Loyd | 294/15 |
| 2,439,907 | 4/1948 | Poglein | 294/26 |
| 2,499,841 | 3/1950 | Ulmer | 294/26 |
| 3,429,606 | 2/1969 | Brasseur | 294/26 |
| 3,556,577 | 1/1971 | Brasseur | 294/15 |
| 3,583,744 | 6/1971 | West | 294/15 |
| 3,727,962 | 4/1973 | Risinger | 294/16 |

OTHER PUBLICATIONS

Sky Climber, Inc. Catalog, SC–Cat pp. 2–15, Oct. 1993.

Primary Examiner—Dean Kramer
Attorney, Agent, or Firm—Pravel, Hewitt, Kimball & Krieger

[57] ABSTRACT

A transport tool which is attachable to a hoist mechanism for a suspended access work platform permits the mechanism to be easily lifted and moved about on a job site. The transport tool attaches to the hoist mechanism and affords a place for a service crew member to easily lift the mechanism and carry it. The mechanism may thus be easily moved with less likelihood of dropping or damage, and also less risk of injury or strain in lifting or carrying it.

18 Claims, 3 Drawing Sheets

HOIST TRANSPORT TOOL

BACKGROUND OF INVENTION

1. Field of Invention

The present invention relates to tools for lifting and transport of hoist mechanisms for suspended access work platforms.

2. Description of Prior Art

Suspended access work platforms have been widely used for a number of purposes. Perhaps the most commonly recognized use has been by building window washers. There are, however, a considerable number of different industrial and commercial applications for these platforms both inside and outside of structures in maintenance, construction, repair, assembly, cleaning and the like.

Hoist mechanisms are attached to the suspended access platforms to raise and lower them on cables to the desired work locations or surfaces. The hoist mechanisms are removable from the platform when not in use. There have been problems with the removable hoist mechanisms, particularly in lifting and transporting them.

For example, there was no convenient or suitable place to adequately grasp or hold the hoist mechanism to lift and carry it. Attempts to hand lift the hoist and arm carry it could often result in injury to the crew member. If a crew member grasped the hoist by a hose or other flexible coupling, the coupling would often become damaged, due to the weight of the hoist. Additionally, the hoist mechanism could be dropped and damaged while it was being carried.

SUMMARY OF INVENTION

Briefly, the present invention provides a new and improved tool for lifting and transporting a hoist mechanism for a suspended access work platform. The hoist mechanism is of the type having a power supply socket with a connector flange and a connector flat surface on the flange for connecting of power to it. The lifting and transporting tool of the present invention includes a connector mechanism with a mating surface adapted to engage the connector flat on the power supply socket of the hoist mechanism. The connector mechanism is adapted to rotatably connect with and interengage the tool and the power supply socket of the hoist mechanism. If desired, a safety lock or clip mechanism may also be provided as a part of the connector mechanism. The lifting and transporting tool also includes a grip handle extending outwardly from the connector mechanism so that a user may grasp the lifting tool with one or both hands when the tool is connected to the hoist mechanism to lift and transport the hoist mechanism.

DESCRIPTION OF THE PREFERRED EMBODIMENT

Figure 1:
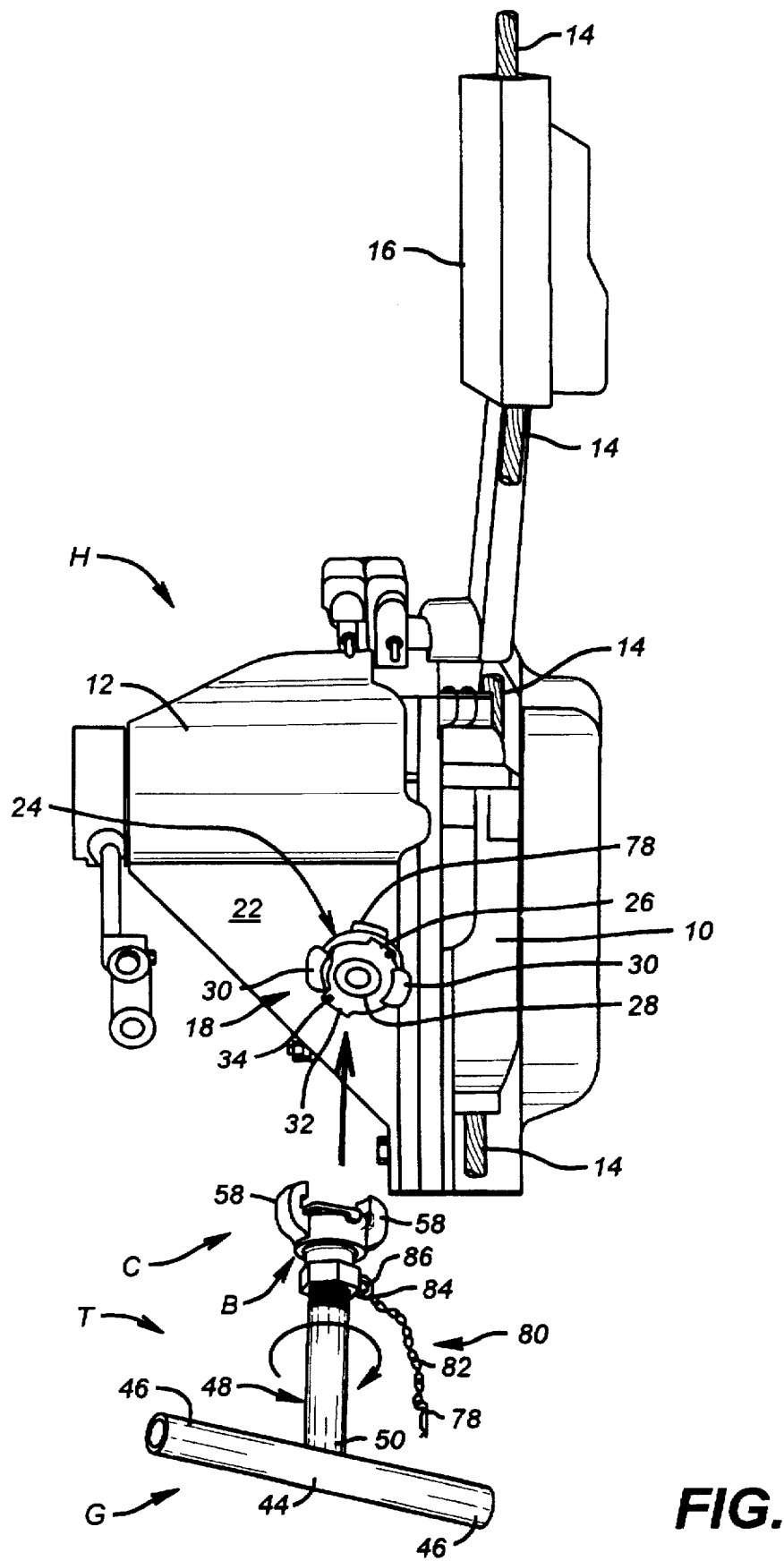
FIG. 1 is a partially exploded isometric view of a hoist mechanism for a suspended access work platform, together with a lifting and transport tool according to the present invention.

In the drawings, the letter H (FIG. 1) designates generally and in schematic form a typical, commercially available hoist mechanism with which a transport tool T in accordance with the present invention is used. The hoist mechanism H is of the type adapted to be connected for use in raising and lowering a conventional suspended access work platform. The hoist mechanism H may be, for example, of the type sold as Model M-4 Air by Sky Climber, Inc. of Stone Mountain, Ga. It should be understood, however, that tools according to the present invention may be used with other hoist mechanisms, powered by air or otherwise, from that company or other sources.

The transport tool T is attachable to the hoist mechanism H to permit the mechanism H to be easily lifted and moved about on a job site when the hoist mechanism H is not connected with the work platform. As will be set forth below, the transport tool T is attachable to the hoist mechanism H and permits a service crew member to easily move and lift the hoist mechanism H about the job site.

The hoist mechanism H includes a pulley mechanism 10 driven by an air or otherwise powered motor 12. As is conventional, pulley mechanism 10 reels in and gives out a wire rope or cable, portions of which are shown at 14, to cause the hoist mechanism H to raise or lower the suspended access work platform to which the hoist H is connected. As is also conventional, suitable secondary brakes or safety mechanisms 16 are generally also provided for the wire rope or cable 14 at the hoist mechanism H.

The wire rope 14 moves about the pulley mechanism 10 depending upon the direction of rotation of the pulley mechanism 10 under influence of control switches for the motor 12. The motor 12 is preferably an air or pneumatically driven motor connected at a power supply socket or inlet 18 to receive pneumatic power. It should be understood that the motor 12 may also be an electrically driven one as well, receiving electrical power at the power supply socket 18.

Figure 5:
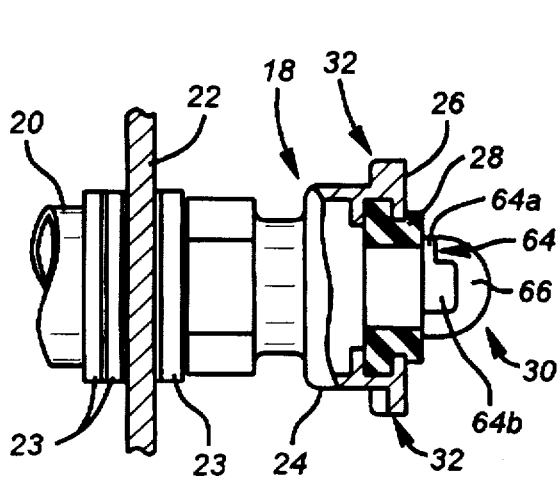
FIG. 5 is an elevation view, taken partly in cross-section, of a portion of the hoist mechanism of FIG. 1.

The power supply socket 18 is connected by a pipe or tube 20 (FIG. 5) passing through a housing wall 22 of the hoist mechanism H. If desired, one or more washers 23 may be mounted on the pipe or tube 20 as stiffeners on each side of the housing wall 22 for additional strength and support. The power supply socket 18 has a connector flange 24 with a connector flat surface 26 which is adapted for connection with a conventional power supply conduit when the hoist mechanism H is in use. The connector flange 24 is provided with a sealing gasket 28 of rubber or other resilient elastomer mounted in the connector flat 26 to seal with the power supply conduit.

The power supply connector flange 24 also has a suitable number of connector lugs 30, usually at least two, formed extending outwardly from it for the purposes of interconnection with the power supply conduit. The power supply connector flange 24 also has two laterally extending connector tabs or ears 32 formed on it. Each connector tab 32 has a rear portion or safety tab with a connector port 34 (FIG. 1) formed in it. The connector port 34 is adapted to receive a locking mechanism, such as a pin or key as will be set forth below, in order to lock the power supply conduit to the power supply socket 18.

Figure 2:
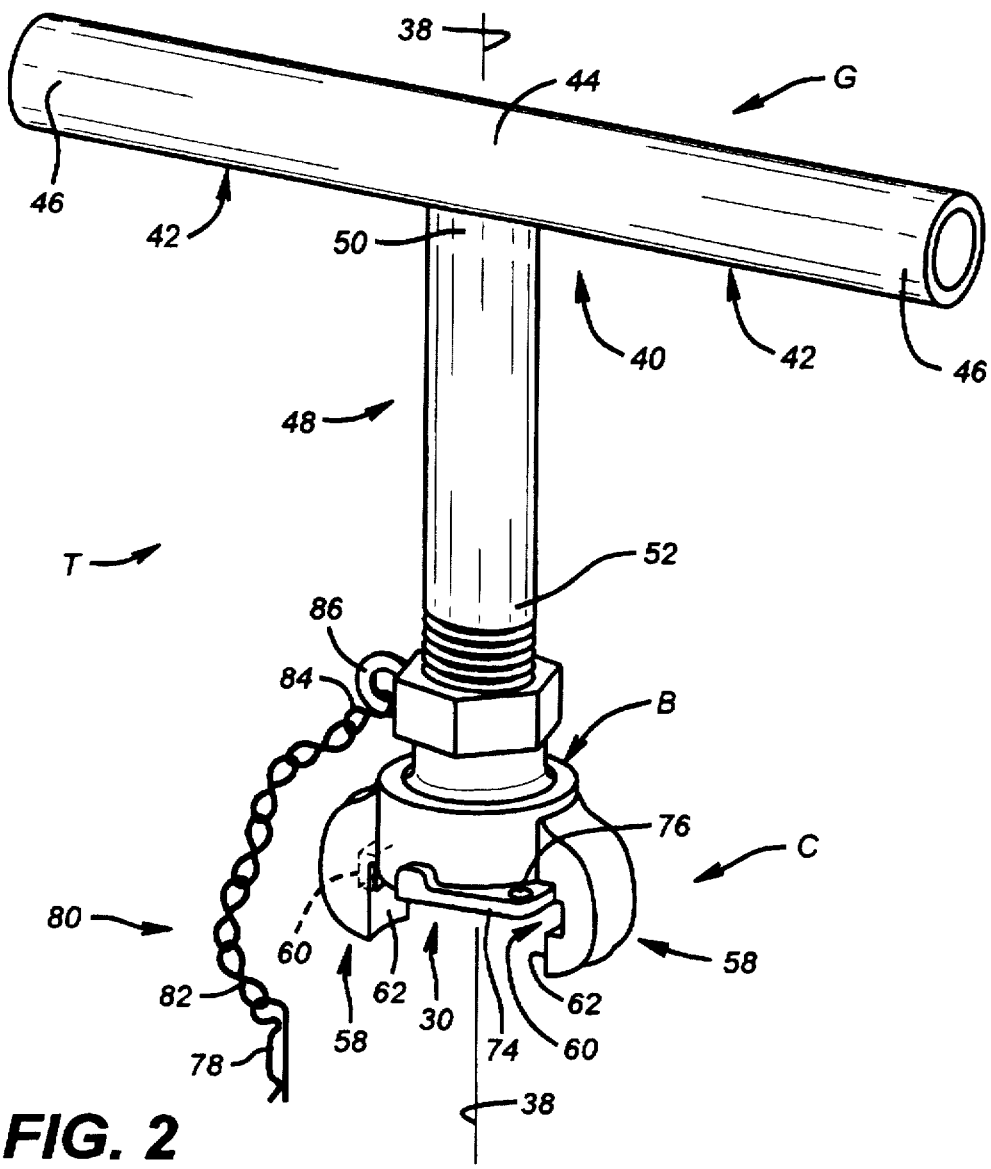
FIG. 2 is an isometric view of a lifting and transport tool according to the present invention.

Considering now the transport tool T of the present invention more in detail, a connector C is provided for attaching to the power supply socket 18 of the hoist mechanism H. The connector C is formed to connector along its longitudinal axis 38 (FIG. 2) with the power supply socket 18. The transport tool T also includes a grip handle G which extends transversely to the longitudinal axis 38 of the connector C.

The grip handle G is formed from a tube or bar 40 of suitable strength metal or other material, taking the form of grip arms 42 extending outwardly from a central portion 44. The grip arms 42 extend outwardly a sufficient distance, usually four or more inches, to allow a user to grasp the grip handle G on each side of the axis 38 of the connector C. An outer surface portion 46 of each of the grip arms 42 may be treated to make it less likely to slip, such as by being knurled, or by being covered with some slip resistant coating or sleeve of rubber or other suitable synthetic resin.

A spacer shaft 48 is provided extending between an outer end 50 adjacent the central portion 44 of the grip handle G and an inner end 52 adjacent the connector C. The spacer shaft 48 is preferably aligned with the connector C and extends therefrom an adequate distance to provide clearance between the grip handle G and the connector C for the user's hands. The spacer shaft 48 may be of the same material as the grip handle G and may be integrally formed with it as a unit. Alternatively, the spacer shaft 48 may be connected by welding or other attaching technique to connect it to the grip handle G.

The connector C (FIG. 4) includes a mating flat sealing surface 54 on a connector body B adapted to engage the connector flat 26 of the power supply socket 18 of the hoist mechanism H. A seal of rubber or other resilient elastomeric sealing material 56 is mounted with the sealing surface 54 of the connector C to engage the sealing gasket 28 in the connector flange 24 of the power supply socket 18.

The connector C also includes a suitable number of lugs 58 (FIGS. 2&4) extending outwardly from the connector body B and the sealing surface 54. The lugs 58 are each provided with a locking slot 60 formed on an inner surface 62 adjacent the sealing surface 54. The locking slots 60 are generally arcuate in form in their extent into surface 62, each adapted to slidingly and rotatably receive one of the connector tabs 32 (FIG. 1) of the connection flange 24.

Figure 4:
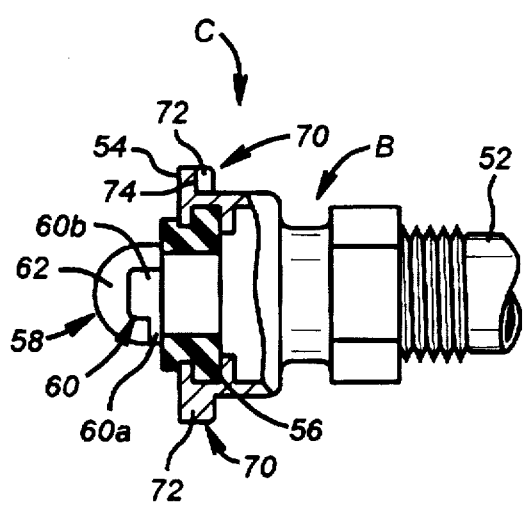
FIG. 4 is an elevation view, taken partly in cross-section, of a portion of the lifting and transport tool of FIG. 1.

The locking slots 60 have a reduced width inlet portion 60a (FIG. 4) and a larger rear portion 60b. The lugs 30 of the supply socket 18 also have locking slots 64 (FIG. 5) formed in an inner surface 66 adjacent sealing gasket 28. The locking slots 64 are of like structure and shape, including reduced width inlet 64a and larger rear portion 64b, to the locking slots 60 (FIG. 4).

The connector C also includes a set of connector tabs 70 formed extending laterally from the connector body B. The connector tabs 70 are equal in number to the lugs 30 and are adapted to be slidingly fitted into the locking slots 64 of the lugs 60. The connector tabs 70 include an enlarged head or lead portion 72 which compresses the sealing gasket 28 on entering the reduced width inlet 64a of locking slot 64. Connector tabs 32 of connector flange 24 exert a like effect on gasket 56 when entering inlet 60a of locking slot 60. The enlarged head portions of tabs 32 and 70 are forced by the resiliency of the gaskets 28 and 56 into the rear portions 60b and 64b, respectively, of slots on further rotation of the grip handle G.

Figure 3:
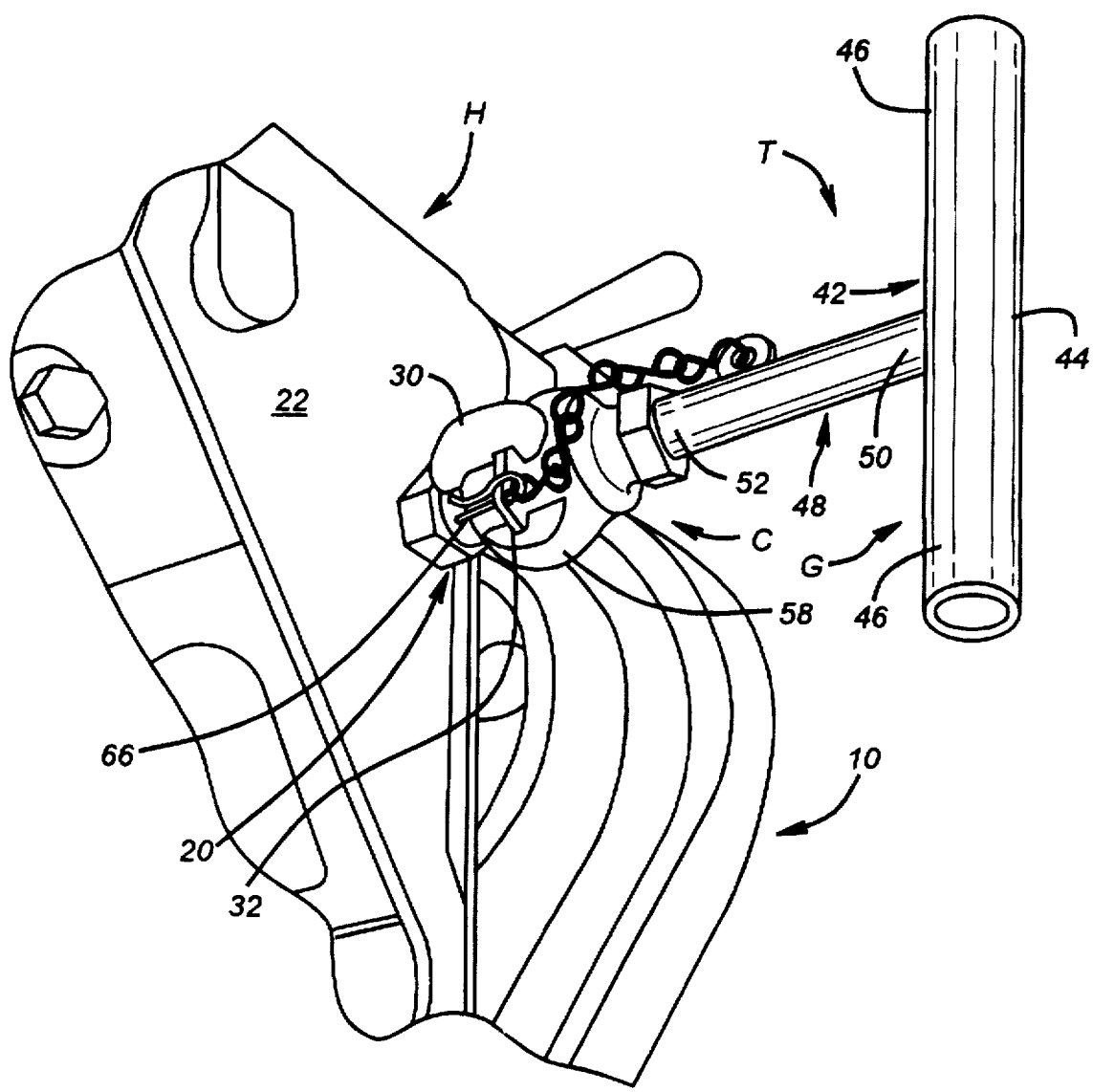
FIG. 3 is an isometric view of the hoist mechanism and the lifting and transport tool of FIG. 1 coupled together.

The connector tab 70 also includes a rear portion 74 which functions as a connector tab (FIG. 2), having a locking port or passage 76 extending through it. The rear portion 74 of tab 70 and locking port 76 are located on the connector C at a position adapted for alignment with port 34. Thus, when the tabs 32 and 70 are lockingly fitted within their respective locking slots 60 and 64, the port 76 is aligned with the connector port 34 (FIG. 1) of the power supply connector flange 24. When this occurs, a locking pin or clip 78 may be inserted through each set of the aligned ports 76 and 24 (FIG. 3) to prevent relative movement and possible loosening of the connection between the tool T and the power supply socket 18 of the hoist mechanism H.

A retainer chain or cord 80 is attached at a first end 82 to the locking clip 78 and at a second end 84 to a connector ring 86 mounted at the lower end 52 of the spacer shaft 48. The retainer chain or cord 80 keeps the locking clip 78 connected to the spacer shaft 48 to prevent misplacement or loss.

In the operation of the present invention, the tool T is used whenever it is desired to lift or transport the hoist mechanism H, such as to move it for connection on a suspended work platform. The connector body C of the tool T is initially generally aligned with the power supply socket 18. The connector body C is then brought into contact with the socket 18 and sealing gaskets 28 and 56 are compressed. The connector tabs 70 and 32 are then aligned with the locking slots 64 and 60, respectively, and the tool T rotated using the grip handle G. Rotation of grip G handle G continues until the ports 76 and 24 are aligned. One or more of the locking pins 78 may then be inserted. The tool T and the hoist mechanism H are then firmly and fixedly attached to each other.

A crew member can then easily lift and transport the hoist mechanism to whatever location is necessary using the grip handle G of the tool T. Disconnection of tool T from hoist mechanism H is accomplished by reversing the direction of rotation of grip handle G, using a compressive force against the compressive resilient action of the gaskets 28 and 56.

It can thus be seen that the tool T is easily attachable to the hoist mechanism H. The tool T further permits the mechanism H to be easily lifted and moved about on a job site. The tool T affords a readily accessible place with its grip handle G for a crew member to readily lift and carry the hoist mechanism once attached. The hoist mechanism H may be readily moved with less likelihood of dropping or damage, and also with less risk of injury or strain by the crew member in lifting and carrying it.

Having described the invention above, various modifications of the techniques, procedures, material and equipment will be apparent to those in the art. It is intended that all such variations within the scope and spirit of the appended claims be embraced thereby.

I claim:

1. A tool for lifting and transporting a hoist mechanism for a suspended access work platform, comprising:
   connector means for attaching to the hoist mechanism at a power supply connection thereof;
   a locking mechanism for coupling said connector means and the power supply connection of the hoist mechanism; and
   a grip handle extending transversely with respect to said connector means so that a user may grasp the tool with one or both hands when the tool is connected to the hoist mechanism for lifting and transporting the hoist mechanism.

2. The tool of claim 1, further including:
   a spacer shaft mounted between said grip handle and said connector means.

3. The tool of claim 2, wherein:
   said spacer shaft is mounted aligned with said connector means and transverse to said grip handle.

4. The tool of claim 3, wherein:
   said grip handle extends transversely with respect to said spacer shaft a sufficient distance to allow a user to grasp said grip handle on each side of said spacer shaft.

5. The tool of claim 1, wherein the hoist mechanism is pneumatically driven, and wherein:
   said connector means comprises means for attaching to the hoist mechanism at a pneumatic supply connection thereof.

6. The tool of claim 1, wherein the hoist mechanism is pneumatically driven, and wherein:

said connector means comprises means for attaching to the hoist mechanism at a pneumatic inlet supply connection thereof.

7. The tool of claim 1, wherein the hoist mechanism is pneumatically driven, and wherein:

said connector means comprises means for attaching to the hoist mechanism at a pneumatic outlet supply connection thereof.

8. The tool of claim 1, wherein the hoist mechanism is pneumatically driven, and wherein:

said connector means comprises means for attaching to the hoist mechanism at a pneumatic supply connection thereof and having a seal at said supply connection; and further including means for engaging the supply connection seal for protecting same from damage.

9. The tool of claim 1, further including:

a spacer shaft mounted between said grip handle and said connector means; and said locking mechanism being attached between said spacer shaft and said connector means.

10. The tool of claim 1, wherein the hoist mechanism has a power supply socket having a connector flange and connector flat therewith and said connector means comprises:

a mating flat sealing surface for engaging the connector flat on the power supply socket of the hoist mechanism.

11. The tool of claim 10, wherein a sealing gasket is mounted in the connector flange of the power supply socket of the hoist mechanism, and wherein said connector means includes:

seal means mounted in said mating flat sealing surface for engaging the sealing gasket in the connector flange for protecting the sealing gasket from damage.

12. The tool of claim 10, wherein the power supply socket connector flange has outwardly extending connector tabs formed thereon, and wherein said connector means includes:

a plurality of lugs extending outwardly from said mating flat sealing surface;

each of said lugs having locking slots formed on inner surfaces adjacent said flat sealing surface to receive the connector tabs of the power supply connector flange.

13. The tool of claim 10, wherein the power supply socket connector flange has a safety tab formed thereon with a connector port formed therethrough, and wherein said connector means includes:

a collar tab extending outwardly from said mating flat sealing surface;

said collar tab having a locking port formed therein adapted for alignment with said connector port of the power supply socket connector flange to receive said locking mechanism.

14. A tool for lifting and transporting a hoist mechanism for a suspended access work platform, said hoist mechanism having a power supply socket with a connector flange and connector flat for connection of power thereto, said tool comprising:

connector means having a mating flat sealing surface for engaging the connector flat on the power supply socket of the hoist mechanism;

a spacer shaft mounted with said connector means; and a grip handle extending transversely with respect to said connector means and said spacer shaft so that a user may grasp the tool with one or both hands when the tool is connected to the hoist mechanism for lifting and transporting the hoist mechanism.

15. The tool of claim 14, wherein a sealing gasket is mounted in the connector flange of the power supply socket of the hoist mechanism, and wherein said connector means includes:

seal means mounted in said mating flat sealing surface for engaging the sealing gasket in the connector flange for protecting the sealing gasket from damage.

16. The tool of claim 14, wherein the power supply socket connector flange has outwardly extending connector tabs formed thereon, and wherein said connector means includes:

a plurality of lugs extending outwardly from said mating flat sealing surface;

each of said lugs having locking slots formed on inner surfaces adjacent said flat sealing surface to receive the connector tabs of the power supply connector flange.

17. The tool of claim 14, wherein the power supply socket connector flange has a safety tab formed thereon with a connector port formed therethrough, and wherein said connector means includes:

a collar tab extending outwardly from said mating flat sealing surface;

said collar tab having a locking port formed therein adapted for alignment with said connector port of the power supply socket connector flange to receive a locking mechanism.

18. The tool of claim 17, further including:

a locking mechanism for coupling said connector means and the power supply connection of the tool.

* * * * *